March 18, 1958     B. G. PUGH     2,827,325
PERSONNEL AND CARGO LANDING NETS
Filed Oct. 11, 1955
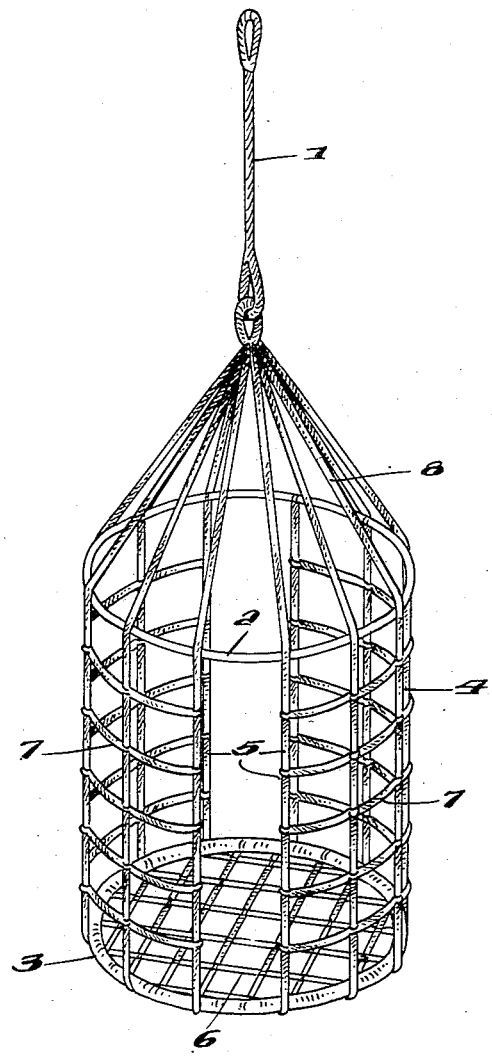
INVENTOR
BILLY GENE PUGH,
BY
ATTORNEY though
2,827,325
PERSONNEL AND CARGO LANDING NETS Billy Gene Pugh, Corpus Christi, Tex.

Application October 11, 1955, Serial No. 539,857

3 Claims. (Cl. 294—77)

The invention relates to improvements in personnel and cargo nets in which individuals or inanimate material may be transferred from one ship to another or from a ship to a stationary platform. The net is designed to be supported by a flexible hoisting cable actuated by a crane or the like.

An object of the invention is to provide a net assembly formed of at least two spreader rings with lacings or ropes extending longitudinally of the device connecting circumferentially spaced portions of the rings to each other with circumferentially extending lacings or ropes to provide a cage with the circumferentially lacings omitted between two adjacent longitudinally extending ropes so that when the longitudinally extending lacings are taut the opening is of such small dimensions as to prevent the escape of certain types of cargo or individuals.

Other objects and features of the invention will be appreciated and become apparent as the present disclosure proceeds and upon consideration of the annexed drawing and the following detailed description wherein an embodiment of the invention is disclosed.

The drawing represents a perspective view of a personnel and cargo landing net exhibiting the invention.

The device is provided with a flexible cable or rope 1 having an eyelet in the upper end which may be arranged over a hook or the like carried by a hoisting cable so that the personnel or cargo landing net may be readily lifted and moved. The net assembly includes two metal spreader rings 2 and 3. The base spreader ring 3 may be wrapped or covered in any suitable manner so as to cushion the bottom of the device against impact when the net is lowered onto a loading deck or the like. The area embraced by the base ring 3 is closed by suitable means such as lacings 6 which extend in chordal directions with reference to the circumference of the base ring 3. The bottom may be closed in any suitable manner so as to provide a strong flexible bottom which will support the weight of several individuals or a load of cargo.

A plurality of longitudinally extending lacings or ropes 4 extend from the upper spreader ring 2 to the base spreader ring 3. The lacings or ropes 4 are circumferentially spaced from each other and are connected to the rings 2 and 3.

The net structure includes circumferentially extending flexible lacings 7 which are connected to the longitudinally extending lacings or ropes 4 at spaced intervals along the lengths thereof. The lacings 7 are omitted between two adjacent longitudinally extending ropes 4 to provide an opening 5. The circumferentially extending lacings 7 may be omitted between at least two other adjacent longitudinally extending ropes to provide a second opening 5.

Suitable means is provided for connecting the upper spreader ring to the cable or rope 1 and such means may take the form of ropes 8 which converge towards each other in proceeding upwardly from the ring 2.

The longitudinally or vertically extending ropes 4 and the circumferentially or normally horizontally extending ropes 7 form a cage to keep individuals or cargo within the net structure while the longitudinally extending lacings 4 are taut or while the net is being supported by the cable 1 during transfer of the net from a loading station to a discharge station. When the bottom of the net assembly is resting or supported on a firm surface a downward movement of the upper spreader ring 2 relative to the base spreader ring 3 will cause the longitudinally extending lacings 4 to flex whereby either of the openings 5 may be laterally enlarged to permit the entry or removal of cargo or the entry or exit of individuals from within the net.

While the invention has been described with reference to specific structural features and with regard to use of particular materials it will be appreciated that changes may be made in the overall organization as well as the structural elements. Such modifications and others may be made without departing from the spirit and scope of the invention as set forth in the new claims.

What I claim and desire to secure by Letters Patent is:

I claim:

1. A personnel or cargo net comprising, a base spreader ring, an upper spreader ring, means stretched across and carried by said base spreader ring for supporting personnel or cargo between the perimeter of said base ring, circumferentially spaced longitudinally extending flexible lacings connecting the perimeter of the base ring to the perimeter of the upper ring, means carried by the upper ring for attaching a supporting element, circumferentially extending flexible lacings connected to said longitudinally extending lacings at spaced intervals along lengths thereof to provide a flexible netting substantially enclosing the area between the two rings, and said circumferentially extending lacings being omitted between two adjacent longitudinally extending lacings whereby an opening of greater lateral dimension than the space between the taut adjacent longitudinal lacings is formed for entry or exit of personnel or cargo when the rings are positioned closer to each other than in the taut condition of the longitudinal lacings.

2. A personnel or cargo net according to claim 1, wherein the circumferential lacings are omitted at diametrically opposite areas between two adjacent longitudinal lacings.

3. A personnel or cargo net comprising, a base spreader ring, an upper spreader ring, means closing the area between the circumference of the base spreader ring serving as a bottom for the net to support a load over an area defined by the perimeter of said base ring, circumferentially spaced longitudinally extending flexible non-elastic elements connecting the perimeter of the base ring to circumferentially spaced portions of said upper spreader ring, means carried by the upper ring for attachment to a supporting device, circumferentially extending flexible non-elastic elements connected to said longitudinally extending elements at spaced points therealong to provide a flexible netting substantially enclosing the area between the two rings, and said circumferentially extending elements being omitted between at least two longitudinally extending elements whereby an opening of greater lateral dimensions than the space between taut adjacent longitudinal elements is formed when the rings are positioned nearer to each other than in the taut condition of the longitudinally extending elements.

References Cited in the file of this patent

UNITED STATES PATENTS

| | | |
|---|---|---|
| 1,085,794 | Bowman | Feb. 3, 1914 |
| 1,088,939 | Snee | Mar. 3, 1914 |
| 1,188,185 | Krulish | June 20, 1916 |
| 1,457,304 | Hodgson | June 5, 1923 |